United States Patent [19]

Watt et al.

[11] 4,003,980

[45] Jan. 18, 1977

[54] URANIUM DIOXIDE PREPARATION

[75] Inventors: George W. Watt, Austin, Tex.;
Daniel W. Baugh, Jr., Baton Rouge, La.

[73] Assignee: Exxon Nuclear Company, Inc., Bellevue, Wash.

[22] Filed: May 21, 1975

[21] Appl. No.: 579,495

[52] U.S. Cl. .................. 423/261; 252/301.1 R; 260/429.1; 423/11

[51] Int. Cl.$^2$ .................................... C01G 43/02

[58] Field of Search .......... 423/11, 261; 260/429.1; 252/301.1 R

[56] References Cited

UNITED STATES PATENTS

| 3,027,391 | 3/1962 | Frigerio | 260/429.1 |
|---|---|---|---|
| 3,102,848 | 9/1963 | Merlub-Sobel | 423/261 X |
| 3,725,293 | 4/1973 | Haas | 423/11 X |
| 3,801,701 | 4/1974 | Robins et al. | 423/261 |
| 3,816,372 | 6/1974 | Lugli et al. | 260/429.1 |

*Primary Examiner*—Edward A. Miller
*Attorney, Agent, or Firm*—Jack Matalon

[57] ABSTRACT

An actinide dioxide, e.g. uranium dioxide, is prepared by reacting an actinide nitrate or hydrate or tetrahydrofuranate thereof, e.g. uranyl nitrate, a hydrate of uranyl nitrate or a tetrahydrofuranate of uranyl nitrate with an alkali or alkaline earth metal adduct of a monocyclic or polycyclic hydrocarbon in the presence of an inert organic solvent. Typically, the starting material may be uranyl nitrate dihydrate or uranyl nitrate ditetrahydrofuranate (the latter material is a novel composition of matter) with a reactant such as the sodium adduct of naphthalene in the presence of a solvent such as tetrahydrofuran. The resultant uranium dioxide may be further purified by heating it in the presence of hydrogen.

15 Claims, No Drawings

URANIUM DIOXIDE PREPARATION

BACKGROUND OF THE INVENTION

This invention relates to a process for the preparation of actinide dioxides, especially uranium dioxide, plutonium dioxide and neptunium dioxide as well as to a novel composition of matter resulting from this process. Those concerned with the production of nuclear fuel have been constantly searching for processes for the production of uranium dioxide which are cheaper, less complex, result in the production of uranium dioxide in a pure state and further result in the production of ceramically active forms of actinide dioxides, e.g. uranium dioxide (i.e. the physical form of the uranium dioxide must be such as to permit sintering thereof which is a necessary step in the preparation of uranium dioxide pellets for use in nuclear fuel rods.

The present invention accomplishes all of the results set forth above by a process which permits the direct conversion of an actinide nitrate, a hydrate thereof or a tetrahydrofuranate thereof to the actinide dioxide. Actinide compounds, such as uranyl nitrate hexahydrate, are available commercially (and may be used as is, or dehydrated or converted to the ditetrahydrofuranate); uranyl nitrate hexahydrate is commonly produced during the process in which uranium is extracted from the ores, converted by a series of steps ultimately to "yellow cake" which consists principally of $UO_3$, other oxides of uranium, and associated impurities. Following purification, usually by appropriate solvent extraction processes, the last step involves extraction of the uranium from an organic solvent into nitric acid solution; from this solution, pure uranyl nitrate hexahydrate is separated as a solid. This product is calcined to yield $UO_3$, which is reduced to $UO_2$ and thereafter fluorinated in two steps to obtain uranium hexafluoride and treated with nitric acid to obtain uranyl nitrate hexahydrate, calcined to yield $UO_3$, reduced to yield $UO_2$, and thereafter fluorinated into two steps to obtain uranium hexafluoride. The uranium hexafluoride in turn is purified by successive distillations so as to yield a product with impurities in the parts per million range and the purified uranium hexafluoride may then be used in isotope enrichment processes, reduced with calcium to provide uranium metal of sufficient purity for use in the production of "weapons grade" plutonium or subjected to further purifications to result in the production of uranium dioxide in a degree of purity suitable for use as fuel for nuclear power reactors.

The present invention eliminates the need for many of the complexed purification steps which would otherwise be required after uranium has been extracted from ores and has been converted to uranyl nitrate hexahydrate. If plutonium dioxide is available as the "enriched" fuel, the uranium dioxide produced by the present process may be admixed with the plutonium dioxide and thereafter used in nuclear fuel rods. Alternatively, only a small fraction of the enormous quantities of uranium hexafluoride presently processed need be purified and subsequently enriched in the $U^{235}$ isotope (in the form of $U^{235}F_6$ which is then converted to $U^{235}O_2$) and the bulk of the $U^{238}O_2$ required for nuclear fuel materials may be made by the process of this invention and thereafter admixed with the enriched $U^{235}O_2$ material to obtain a blend suitable for use as pellets in nuclear fuel rods.

In recent years, efforts have been made to reduce the complexity of processes for the production of uranium dioxide in order to reduce fuel costs. For example, J. Belle ("Uranium Dioxide: Properties and Nuclear Applications", USFC, 1961) atomized a solution of uranyl nitrate hexahydrate in the high temperature reducing atmosphere of a flame to produce uranium dioxide; however, this process provided no selectivity of reaction and impurity levels in the final product were essentially the same in the feed liquor. Researchers at the Argonne National Laboratory, in 1963, converted $UF_6$ directly to $UO_2$ by a high temperature gas phase reaction of $UF_6$ with $H_2O$ and $H_2$, but the resultant product still contained intolerable fluoride ion levels. In 1962, R. S. Wilkes (J. Nucl. Mat., Vol. 7, page 157 (1962)) prepared uranium dioxide by electrolysis of a solution of uranyl chloride ($UO_2Cl_2$) in a molten salt bath, but the resultant product contained higher oxide impurities.

DETAILS OF THE PRESENT INVENTION

The Starting Material

The starting material for this invention is a compound such as plutonyl, neptunyl or uranyl nitrate, a hydrate thereof or a tetrahydrofuranate thereof. Examples of preferred starting materials include uranyl nitrate (anhydrous), uranyl nitrate dihydrate, uranyl nitrate tetrahydrate, uranyl nitrate hexahydrate, etc. as well as uranyl nitrate ditetrahydrofuranate (this latter material is a novel composition of matter the synthesis of which is set forth below). In order to diminish the quantity of metal adduct (i.e. the reducing agent) which is required to reduce the uranyl nitrate to uranium dioxide, it is desirable that the starting material be as anhydrous as possible. Where the starting material is a hydrate of uranyl nitrate, additional amounts of the metal adduct must be present since the water of hydration will consume metal adduct (and thus such quantity of metal adduct would not be available for the reduction reaction). In the case of uranyl nitrate hexahydrate, it is convenient to first dehydrate it to the dihydrate, thereby eliminating four of the six water molecules.

The actinide nitrate hexahydrate, e.g. uranyl nitrate hexahydrate, may be readily dehydrated to the dihydrate by the method of E. M. Gatehouse et al reported in "J. Chem. Soc.", Volume 1958, page 3965.

The actinide nitrate ditetrahydrofuranate, e.g. uranyl nitrate ditetrahydrofuranate, may be readily prepared by the reaction of potassium uranyl nitrate with tetrahydrofuran. Potassium uranyl nitrate in turn may be prepared by the method of Allpress and Hambly as reported in Australian J. Chem., Volume 12, page 569 (1959). This latter reaction utilizes uranyl nitrate hexahydrate and potassium nitrate in stoichiometric amounts in the presence of concentrated nitric acid. The potassium uranyl nitrate may be reacted with about 2 to about 100 moles, preferably 2 to 10 moles of tetrahydrofuran and the bright yellow-green fluorescent color immediately disappears upon addition of the tetrahydrofuran. Upon stirring, the bright yellow solution resulted leaving a white solid residue. Filtration of the solution followed by removal of the tetrahydrofuran by distillation under reduced pressure yields the uranyl nitrate ditetrahydrofuranate crystals which are very hygroscopic.

The Metal Adduct

The reducing agent for the processes of this invention comprises a metal adduct of a monocyclic or polycyclic hydrocarbon. The metal may be an alkali metal (i.e. a metal of Group Ia of the Periodic Table) or an alkaline earth metal (i.e. a Group IIa metal of the Periodic Table). The monocyclic hydrocarbon may be, for example, benzene, toluene, styrene, etc. The polycyclic hydrocarbon may be, for example, naphthalene (which is preferred), anthracene, phenanthrene, benzophenone, tetraphenylethylene, etc. Examples of suitable alkali metals include lithium, sodium (which is preferred), potassium, cesium, etc. Examples of suitable alkaline earth metals include magnesium, calcium, strontium, barium, etc. The reactions for the preparations of these adducts are well known, e.g. sodium, naphthalene and an ether such as dimethyl ether will readily form the dark green adduct. Other ethers such as dimethyl ether, methylethyl ether, methyl n-propyl ether, methyl isopropyl ether, methylal, ethylene glycol dimethyl ether, ethylene glycol formal, dioxane, tetrahydrofuran, glycerol trimethyl ether, ethyl ortho formate, etc. may also be used in place of dimethyl ether. Instead of the ethers, tertiary amines such as trimethylamine may be substituted for the preparation of these adducts.

The Solvent

The solvent for the reduction reaction may be any organic liquid which is inert to the reduction reaction. Typical examples of suitable solvents include substituted and unsubstituted aromatic hydrocarbons such as benzene, toluene, xylene, etc.; linear ethers such as those mentioned above which are useful in the preparation of the metal adducts; cyclic ethers such as furan, tetrahydrofuran, p-dioxane, the so-called crown ethers, etc.

General Reaction Conditions

A solution of the metal adduct (e.g. sodium naphthalenide) in a suitable organic solvent (e.g. tetrahydrofuran) is added to a solution of the actinide nitrate, e.g. uranyl nitrate, uranyl nitrate hydrate or uranyl nitrate tetrahydrofuranate in the same or different suitable solvent (conveniently the solvent is also tetrahydrofuran). If the uranyl nitrate starting material is anhydrous or if it is present in the form of uranyl nitrate tetrahydrofuranate, the metal adduct is generally utilized in a molar ratio of about 2 to above 10, preferably 2 to 4 moles per mole of the anhydrous starting material. If the starting material is present in the form of a hydrate (e.g. as the dihydrate, tetrahydrate, hexahydrate, etc.), the molar ratio of metal adduct must be increased to reflect the amount of water of hydration present, since such water of hydration will result in a consumption of the metal adduct. Generally, and depending on the solvent employed, the concentration of the metal adduct in the organic solvent will range from about 1 to about 15 percent, preferably 3 to 5 percent, whereas the concentration of the starting material in the organic solvent may range from about 1 to above 20, preferably 5 to 10 percent.

Upon addition of the solution of the metal adduct to the solution of the starting material, a very fine brown-orange precipitate will appear immediately. Exposure to air results in immediate oxidation of this precipitate to a yellow solid. To avoid oxidation, the solvent may be removed under reduced pressure and the resultant solid may then be washed with several portions of a suitable solvent such as diethyl ether to remove the naphthalene and then with oxygen-free water to remove the sodium nitrate. The washed, unoxidized material may then be partially purified at elevated temperatures of about 100 to about 500° C., preferably 250 to 350° C. at reduced pressures, e.g. $10^{-2}$ mm Hg for several days, e.g. 3 days. Upon exposure to air, the resultant tan material will not become oxidized.

The procedure described above may be followed up to the point of heating under reduced pressure. At this point, the material may be alternatively heated in a sublimator to a suitable temperature such as about 90° C. and the naphthalene may then be sublimed onto a cold finger. The remaining light brown powder may then be washed with oxygen-free water and it will be found that the resultant solid will still be sensitive to the presence of oxygen, but the rate of oxidation to a yellow product will be much slower. The crude uranium dioxide product may be further purified by heating it to a suitable temperature, e.g. about 700 to about 1600° C., preferably 950° to 1200° C. in a stream of hydrogen for several hours, e.g. about 1 to about 12 hours, preferably 2 to 4 hours. The resultant product will be found to be substantially pure uranium dioxide.

When using the alternative process, potassium uranyl nitrate may be placed in the reactor and thereafter tetrahydrofuran, in a molar ratio of about 2 to about 400, preferably 50 to 100 moles of tetrahydrofuran may be utilized per mole of the potassium uranyl nitrate. To ensure purity, the tetrahydrofuran may be distilled (under reduced pressure) onto the potassium uranyl nitrate which has been placed in the reactor. The bright yellow-green fluorescent color will immediately disappear and, with stirring, a bright yellow solution will result leaving a white solid residue. The solution may then be filtered and the tetrahydrofuran removed by distillation under reduced pressure. Removal of the tetrahydrofuran will result in a large quantity of bright yellow crystals which are very hygroscopic.

The prior art reports the preparation of the compound: $UO_2(NO_3)_2 \cdot 2O(CH_2)_4O$, i.e. an adduct of uranyl nitrate with two moles of p-dioxane, see the article of Kobyshev et al in Doklady Akad. Nauk. U.S.S.R., volume 120, pages 330–332 (1958). Kobyshev et al first prepared anhydrous uranyl nitrate by the method described by Gibson and Katz in J. Am. Chem. Soc., volume 73, page 5436 (1951) by the reaction of uranium trioxide with nitrogen tetraoxide; the reaction product was converted to anhydrous uranyl nitrate by decomposing it at 165° C. under a reduced pressure of $10^{-5}$ mm Hg. The coordination compound of uranyl nitrate with two moles of p-dioxane was obtained by condensation, under reduced pressure, of the p-dioxane (in vapor form) with the anhydrous uranyl nitrate.

Without knowledge of the Kobyshev et al article, efforts were made, in carrying out the instant invention, to dissolve potassium uranyl nitrate in p-dioxane in order to obtain a higher-boiling cyclic ether in which to perform the reduction reaction. Reaction between potassium uranyl nitrate and dioxane was not observed.

Purification of Uranium Dioxide

In order to purify the uranium dioxide obtained by carrying out the reduction reactions noted above (in which the starting material is uranyl nitrate, a hydrate thereof, or a tetrahydrofuranate thereof and the reducing agent is a material such as a sodium-naphthalene adduct), it is desirable to treat the somewhat-impure uranium dioxide by heating it at a temperature of about 700 to about 1600° C., preferably 950° to 1200° C. under a stream of hydrogen for about 1 to about 12 hours, preferably 2 to 4 hours. The resultant uranium dioxide will be quite pure and have a very low content of extraneous materials such as sodium, carbon, hydrogen, etc.

The following examples serve to illustrate the processes and the novel composition of matter of this invention.

EXAMPLE 1

Uranyl nitrate dihydrate was prepared from uranyl nitrate hexahydrate by the method of Allpress et al (Australian J. Chem., volume 12, page 569, 1959). Tetrahydrofuran was purified by passing it through a column of activated alumina to remove any peroxides that might be present and thereafter dried by refluxing over potassium metal. Reagent grade naphthalene was used without further purification. Clean sodium metal was pressed into fine wire and stored under dry xylene. All manipulations, including samplings and weighings were performed in a glove box in a dry oxygen-free atmosphere.

Solid uranyl nitrate dihydrate (1.000 g) was placed together with 250 ml of tetrahydrofuran in a 250 ml flask provided with a glass-covered stirring bar and stirring was initiated. A 10% excess of sodium wire (0.235 g) was quickly dipped into absolute alcohol to clean the surface and then placed under 20 ml of tetrahydrofuran in a 250 ml flask and cut into smaller pieces to increase the exposed surface area and thereby enhance the rate of formation of the sodium naphthalenide. Naphthalene (1.54 g equivalent to a 30% excess) and a glass-covered stirring bar were added to the sodium-tetrahydrofuran mixture. As soon as stirring was begun, the characteristic intense green color of the sodium naphthalenide appeared. Another 30 ml of tetrahydrofuran was added and stirring was continued until the reaction between sodium and naphthalene was complete. The resultant green solution was then transferred to a pressure-equalizing dropping funnel with a ground glass closure at the top. Stirring of the uranyl nitrate solution was continued while the sodium naphthalenide solution was added dropwise over fifteen minutes. Thereafter, the reaction mixture was stirred for about 12 hours to ensure complete reaction. The brown-gray solid phase was separated by filtration under reduced pressure. This solid material was then washed with several portions of diethyl ether to remove naphthalene and then with oxygen-free water to remove sodium nitrate. The washed material was then heated to 295° C. at $10^{-2}$mm Hg for 72 hours and upon subsequent exposure to air, no oxidation of this material was noted; analyses showed only the presence of uranium, carbon, hydrogen and sodium. It was noted that the heat treatment resulted in increases in the uranium and sodium concentrations while carbon and hydrogen concentrations decreased.

EXAMPLE 2

The procedure described above for Example 1 was followed up to the point of heating the brown-gray solid under vacuum. At this point, the material was heated in a sublimator to 90° C. and the naphthalene was sublimed onto a cold finger. The remaining light brown powder was washed with oxygen-free water in a filtration reactor. A 0.2383 g sample of this material was placed in a porcelain boat and heated to 1,000° in a stream of hydrogen for three hours. It was noted that this process resulted in a weight loss of 0.0407 g (17.08%) and the reaction tube became severely etched. The resultant brown-black powder was soft and could easily be ground in a mortar. The analyses for this material were as follows: Calculated for uranium dioxide: U - 88.15. Found: U - 88.23; Na - 0.52; C - 0.01; H - 0.00.

EXAMPLE 3

Potassium uranyl nitrate was prepared by a minor variation in the method recorded by Allpress et al (Australian J. Chem., volume 12, page 569, 1959). Uranyl nitrate hexahydrate and potassium nitrate were weighed out in stoichiometric amounts and dissolved in concentrated nitric acid. The volume of the solution was reduced with a water aspirator until crystals began to form. The solution was then cooled to -10° C. and the resultant yellow-green strongly fluorescent crystals were filtered and air dried. The analysis of this material was as follows: Calculated for potassium uranyl nitrate: U - 48.07; K - 7.90. Found: U - 48.02; K - 7.82.

A 5.3596 g sample of potassium uranyl nitrate prepared in the manner set forth above was placed in a reactor in approximately 50 ml of tetrahydrofuran was distilled onto the salt under reduced pressure. The bright yellow-green fluorescent color immediately disappeared and, with stirring, a bright yellow solution resulted leaving a white solid residue. This solution was filtered and the tetrahydrofuran removed by distillation under reduced pressure. The result was a large quantity of bright yellow crystals which were very hygroscopic. The analysis for the resultant uranyl nitrate ditetrahydrofuranate was as follows: Calculated: U - 44.24; C - 17.84; H - 2.97; N - 5.20. Found: U - 44.06; C - 18.02; H - 3.04; N - 5.18.

EXAMPLE 4

A 10% excess over a 2:1 molar ratio of sodium naphthalenide in tetrahydrofuran was added to a sample of uranyl nitrate ditetrahydrofuranate prepared in the manner set forth in Example 3. The reaction proceeded as set forth above in Example 1. After removal of the naphthalene by sublimation and washing of the reaction product with oxygen-free water, the light chocolate-colored solid reaction product was exposed to air without evidence of oxidation. Analyses indicated the presence of uranium, carbon, hydrogen and sodium.

EXAMPLE 5

A 0.0915 g sample of the uranium dioxide reaction product obtained in Example 4 was heated to 850° C. under a stream of hydrogen for three hours. The resultant brown-black powder showed a loss in weight of 0.0259 g (28.31%). The Vycor tube surrounding the sample area in the furnace was severely etched. Analyses of the resultant uranium dioxide were as follows: Calculated: U - 88.15. Found: U - 87.87; Na - 1.79; C - 0.19; H - 0.04. An increase in the temperature of the furnace to 950° C. during the reduction gave a uranium dioxide product that did not contain carbon or hydrogen and only 0.73% sodium.

EXAMPLE 6

In this example, uranium dioxide was prepared by utilizing potassium uranyl nitrate as the starting material, but the intermediate product, i.e. the uranyl nitrate ditetrahydrofuranate was not isolated. Utilizing the procedures set forth in Examples 1 and 2 above, 2.2392 g potassium uranyl nitrate was reacted in 75 ml of tetrahydrofuran with 2.5464 g sodium naphthalenide in 75 ml of tetrahydrofuran. The brown precipitate observed in the case when uranyl nitrate dihydrate was utilized as the starting material was obtained but it oxidized in air more slowly than the product obtained when the starting material was uranyl nitrate dihydrate. Analyses indicated the presence of uranium, carbon, hydrogen, sodium and potassium. The sodium levels were lower than in the product obtained when uranyl nitrate dihydrate was utilized as the starting material, but the combined sodium and potassium concentrations on a molar basis were comparable to the sodium concentrations obtained when uranyl nitrate dihydrate was the starting material.

EXAMPLE 7

Synthesis of Plutonium (IV) Sulfite Tetrahydrate and Its Conversion to Plutonium (IV) Oxide.

These experiments were carried out as described in Example 1, with the following exceptions: (1) The plutonium solution used in the synthesis of the sulfite was prepared by dissolving 0.503 g of $PuO_2(NO_3)_2 \cdot 6H_2O$ in 100 ml of water. The sodium dithionite solution added thereto consisted of 2.56 g of $Na_2S_2O_4$ dissolved in 100 ml of water. (2) The conversion of $Pu(SO_3)_2 \cdot 4H_2O$ to $PuO_2$ was effected by heating for 1 hr. at 700°. Analysis of the final $PuO_2$ product showed that it contained 88.20% Pu as compared with the calculated value of 88.19%; sodium, if present, was below the limits of qualitative detection by conventional procedures.

EXAMPLE 8

Synthesis of Mixed Sulfites of Uranium (IV) and Plutonium (IV)--as Their Tetrahydrates--and Their Conversion to a Mixture of Uranium (IV) and Plutonium (IV) Oxides.

The sequence of operations in this case essentially duplicated Example 4 except that the initial nitrate solution of the actinides in the 6+ oxidation state was prepared in a manner such that it was approximately 0.1 molar with respect to total actinide concentration but employed 90% uranyl nitrate and 10% plutonyl nitrate. That the $UO_2$-$PuO_2$ mixture was formed in substantially quantitative yield was established using the same technique as are described in Example 1.

What is claimed is:

1. A process for the preparation of an actinide dioxide comprising reacting a starting material comprising an actinide compound selected from the group consisting of (a) plutonyl nitrate, a hydrate of plutonyl nitrate or a tetrahydrofuranate of plutonyl nitrate, (b) neptunyl nitrate, a hydrate of neptunyl nitrate or a tetrahydrofuranate of neptunyl nitrate and (c) uranyl nitrate, a hydrate of uranyl nitrate or a tetrahydrofuranate of uranyl nitrate with a reactant comprising an alkali or alkaline earth metal adduct of a monocyclic or polycyclic hydrocarbon in the presence of an inert organic solvent.

2. The process of claim 1 in which the starting material comprises uranyl nitrate dihydrate.

3. The process of claim 2 in which the starting material comprises uranyl nitrate ditetrahydrofuranate.

4. The process of claim 1 in which the reactant comprises an alkali metal adduct of a polycyclic hydrocarbon.

5. The process of claim 4 in which the alkali metal is sodium.

6. The process of claim 4 in which the alkali metal is lithium.

7. The process of claim 4 in which the polycyclic hydrocarbon is naphthalene.

8. The process of claim 1 in which the solvent comprises a linear ether.

9. The process of claim 1 in which the solvent comprises a cyclic ether.

10. The process of claim 9 in which the solvent is tetrahydrofuran.

11. The process of claim 1 in which the actinide dioxide resulting from the reaction is purified by heating it at a temperature of about 700° to about 1600° C. in the presence of hydrogen for about 1 to about 12 hours.

12. A process for the preparation of uranium dioxide comprising reacting uranyl nitrate dihydrate with the sodium adduct of naphthalene in the presence of tetrahydrofuran.

13. The process of claim 12 in which the uranium dioxide resulting from the reaction is purified by heating it at a temperature of about 700° to about 1600° C. in the presence of hydrogen for about 1 to about 12 hours.

14. A process for the preparation of uranium dioxide comprising reacting uranyl nitrate ditetrahydrofuranate with the sodium adduct of naphthalene in the presence of tetrahydrofuran.

15. The process of claim 14 in which the uranium dioxide resulting from the reaction is purified by heating it at a temperature of about 700° to about 1600° C. in the presence of hydrogen for about 1 to about 12 hours.

* * * * *